(12) United States Patent
Moulds et al.

(10) Patent No.: US 10,165,783 B2
(45) Date of Patent: Jan. 1, 2019

(54) POULTRY CARCASS PROCESSING METHOD

(71) Applicant: Baader Linco, Inc., Kansas City, KS (US)

(72) Inventors: Dion Joseph Moulds, Glennville, GA (US); Gerald Kent Lauer, Lee's Summit, MO (US)

(73) Assignee: Baader Linco, Inc., Kanas City, KS (US)

( * ) Notice: Subject to any disclaimer, the term of this patent is extended or adjusted under 35 U.S.C. 154(b) by 0 days.

(21) Appl. No.: 15/711,154

(22) Filed: Sep. 21, 2017

(65) Prior Publication Data

US 2018/0007921 A1 Jan. 11, 2018

Related U.S. Application Data

(62) Division of application No. 15/333,020, filed on Oct. 24, 2016.

(60) Provisional application No. 62/245,243, filed on Oct. 22, 2015.

(51) Int. Cl.
*A22C 21/00* (2006.01)

(52) U.S. Cl.
CPC ...... *A22C 21/0023* (2013.01); *A22C 21/0007* (2013.01); *A22C 21/0053* (2013.01); *A22C 21/0069* (2013.01)

(58) Field of Classification Search
CPC ... A22C 21/00; A22C 21/0023; A22C 21/003; A22C 21/0046; A22C 21/0084

USPC .......... 452/149, 165, 166, 169, 170
See application file for complete search history.

(56) References Cited

U.S. PATENT DOCUMENTS

| | | |
|---|---|---|
| 3,522,622 A | 8/1970 | Crane |
| 4,616,380 A | 10/1986 | Tieleman |
| 4,658,476 A | 4/1987 | van den Brink |
| 5,188,559 A | 2/1993 | Hazenbroek |
| 5,312,291 A | 5/1994 | van den Nieuwelaar |
| 5,413,525 A | 5/1995 | Braeger |
| 5,951,393 A | 9/1999 | Barendregt |
| 6,004,199 A | 12/1999 | Habenicht et al. |
| 6,095,914 A | 8/2000 | Cornelissen |
| 6,322,438 B1 | 11/2001 | Barendregt et al. |
| 8,834,237 B2 * | 9/2014 | Van Hillo .......... A22C 21/0023 452/167 |
| 2004/0072526 A1 | 4/2004 | Haley et al. |
| 2005/0059334 A1 | 3/2005 | Haley et al. |
| 2015/0272140 A1 | 10/2015 | Peters |

FOREIGN PATENT DOCUMENTS

| | | |
|---|---|---|
| EP | 0 369 544 | 5/1990 |
| EP | 0459580 A1 | 12/1991 |
| EP | 2908649 B1 | 8/2015 |

\* cited by examiner

*Primary Examiner* — Richard T Price, Jr.
(74) *Attorney, Agent, or Firm* — Spencer Fane LLP

(57) ABSTRACT

A method of processing a poultry carcass includes exposing an area of tissue between a leg and the carcass, cutting the tissue between the leg and the carcass where the muscle tissue connecting the leg to the back of the carcass remains intact, and separating the leg bone from the carcass with the leg muscle tissue remaining connected to the back muscle tissue. The cut extends between about 0.1 mm to about 7.0 mm below the surface of the tissue. In an implementation, the teres ligament is cut.

17 Claims, 14 Drawing Sheets

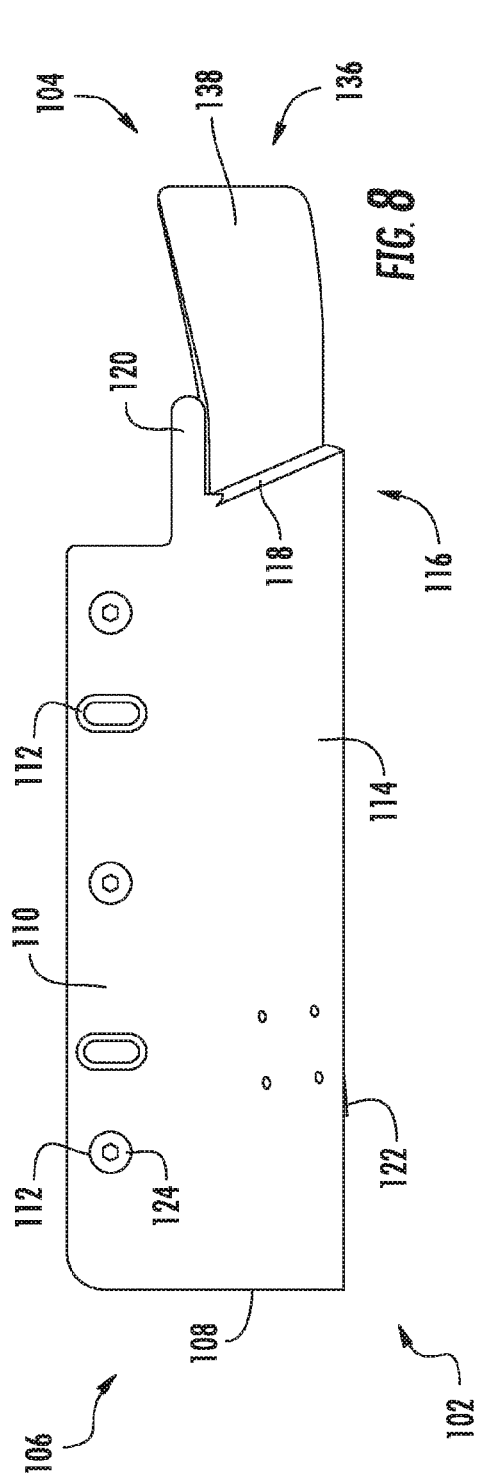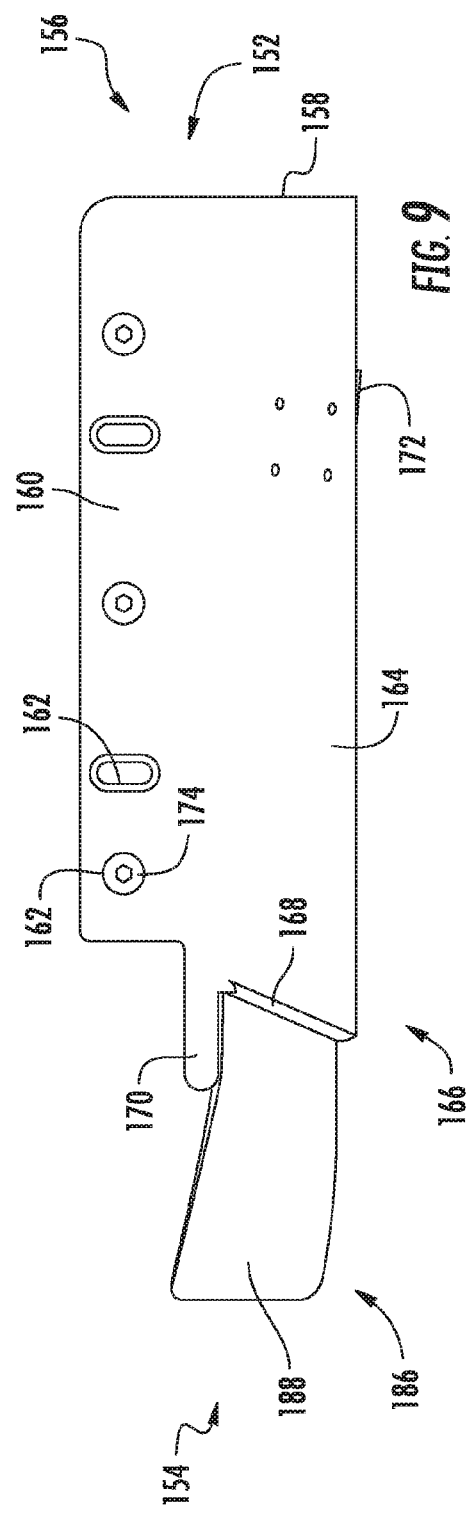

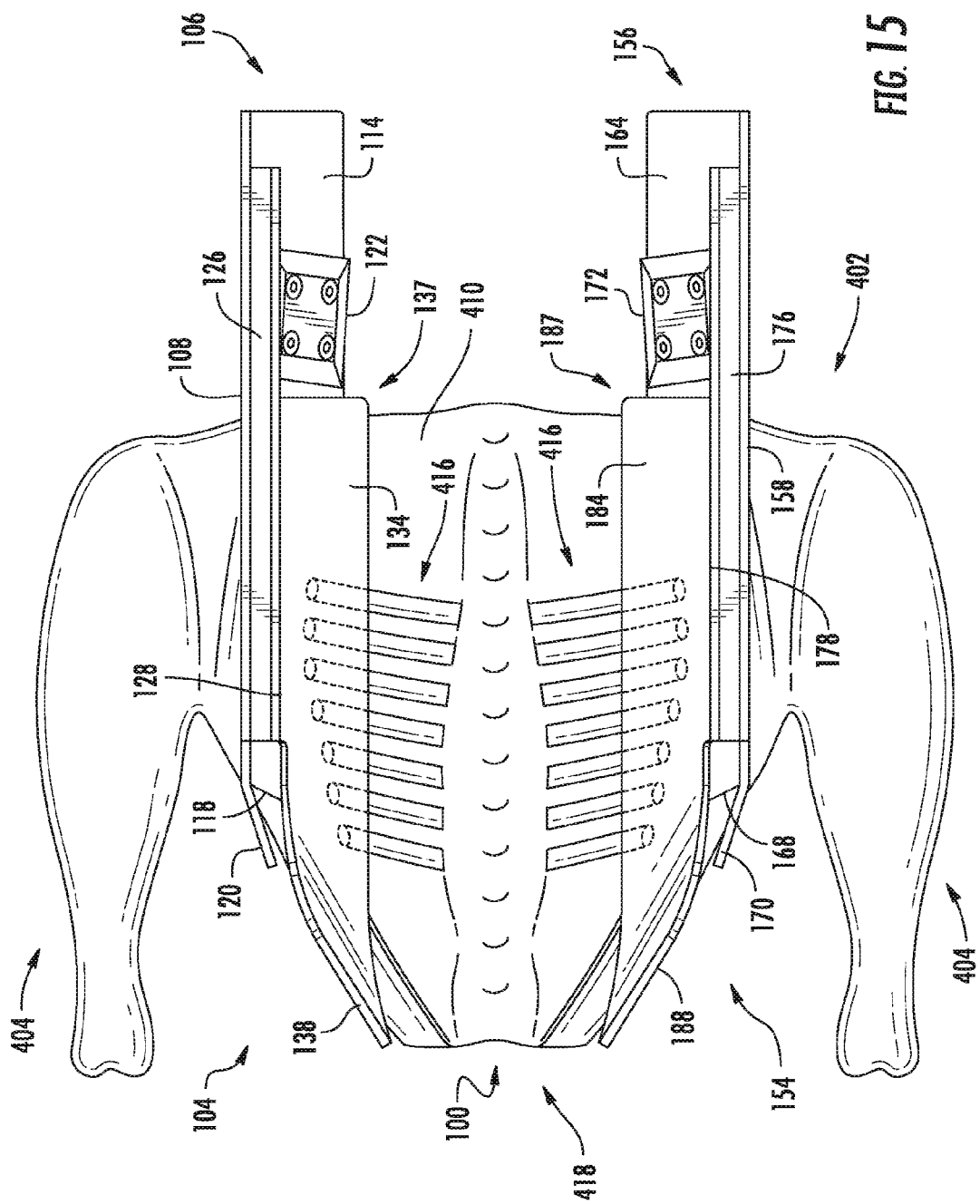

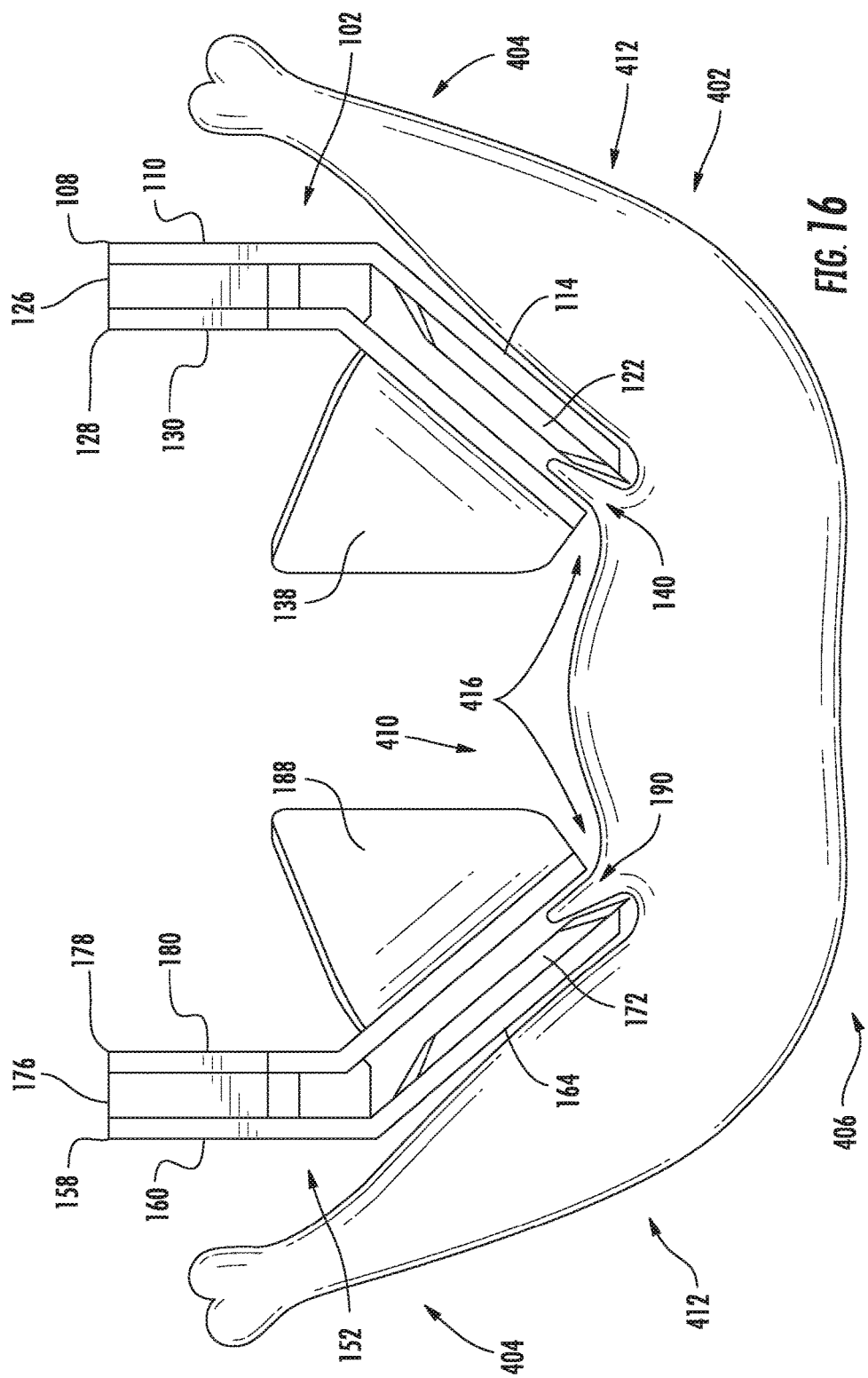

POULTRY CARCASS PROCESSING METHOD

CROSS-REFERENCE TO RELATED APPLICATIONS

This application is a divisional of U.S. Nonprovisional patent application Ser. No. 15/333,020, filed Oct. 24, 2016, titled SEPARATION TOOL, claiming priority in U.S. Provisional Patent Application No. 62/245,243, filed Oct. 22, 2015, titled SEPARATION TOOL, the contents of which are hereby incorporated herein by reference.

BACKGROUND

1. Field of the Disclosed Subject Matter

The disclosed subject matter relates to poultry processing equipment, in particular a cutting blade and guide arrangement for placing a cut at a particular anatomical location on a poultry carcass.

2. Background

The muscle tissue left attached to the back of a poultry carcass during processing decreases consumable yield.

SUMMARY

A method and an apparatus for processing a rear half of a poultry carcass is shown and described whereby a cut is made to the connective tissue between the leg and the back at the interior of the carcass at a depth below the surface of the tissue allowing the muscle tissue connecting the leg and the back to remain intact, thereby allowing a significantly larger amount of meat to stay connected to the leg meat when the leg bones are disengaged from the hip sockets and the back portion is separated from the legs.

An apparatus for processing poultry includes a first assembly with parallel guide plates opposite a second assembly with parallel guide plates. The first and second assemblies include a cutting edge extending beyond a bottom edge of the guide plates. A bracket secures the cutting edge to the guide plate allowing adjustment of the distance between the cutting edge and the bottom of the guide plates. A poultry carcass is advanced into engagement with the apparatus whereby the cutting edges cut the connective tissue between the leg and the back. The bracket presents a leading edge preventing tissue from the poultry carcass from becoming driven between the cutting edge and the guide plate. The bracket further allows the cutting edge to extend further from the bottom edge of the guide plates at the heel than at the point.

In this respect, before explaining at least one embodiment of the disclosed subject matter in detail, it is to be understood that the disclosed subject matter is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present disclosed subject matter. It is important, therefore, that the claims be regarded as including such equivalent constructions insofar as they do not depart from the spirit and scope of the present disclosed subject matter. Though some features of the disclosed subject matter may be claimed in dependency, each feature has merit when used independently.

BRIEF DESCRIPTION OF THE DRAWINGS

The present disclosed subject matter is described herein with reference to the following drawing figures, with greater emphasis being placed on clarity rather than scale:

FIG. 8 is an elevation view of the first assembly.

FIG. 9 is an elevation view of the second assembly.

FIG. 15 is a plan view of the separation tool of FIG. 4 including a poultry carcass being processed through the guide plates.

FIG. 16 is a rear elevation view of the separation tool of FIG. 7 including a poultry carcass being processed through the guide plates.

DETAILED DESCRIPTION

Figure 1:
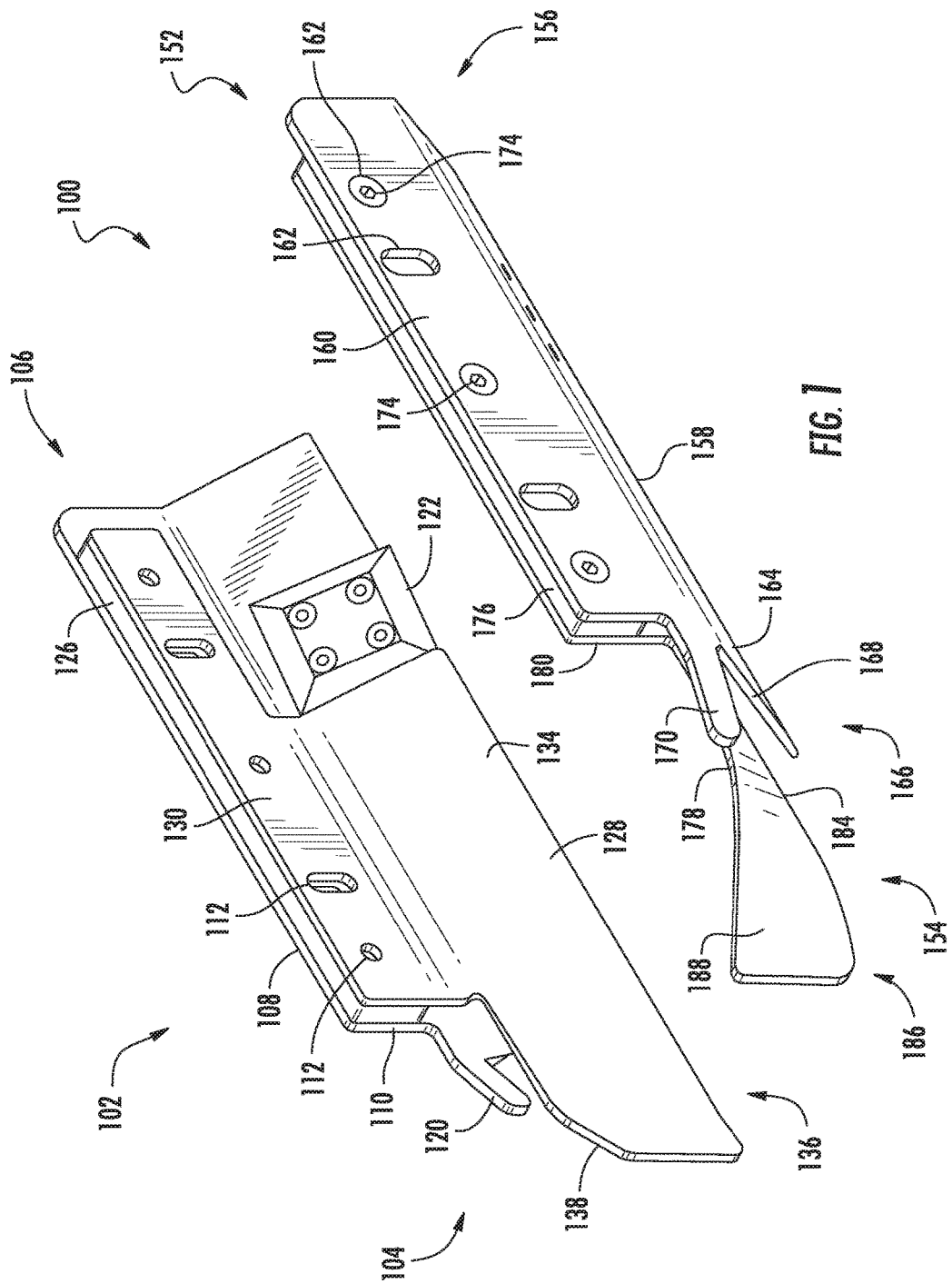
FIG. 1 is an isometric view of the separation tool showing the first and second assemblies spaced apart and adjacent a centerline.
Figure 2:
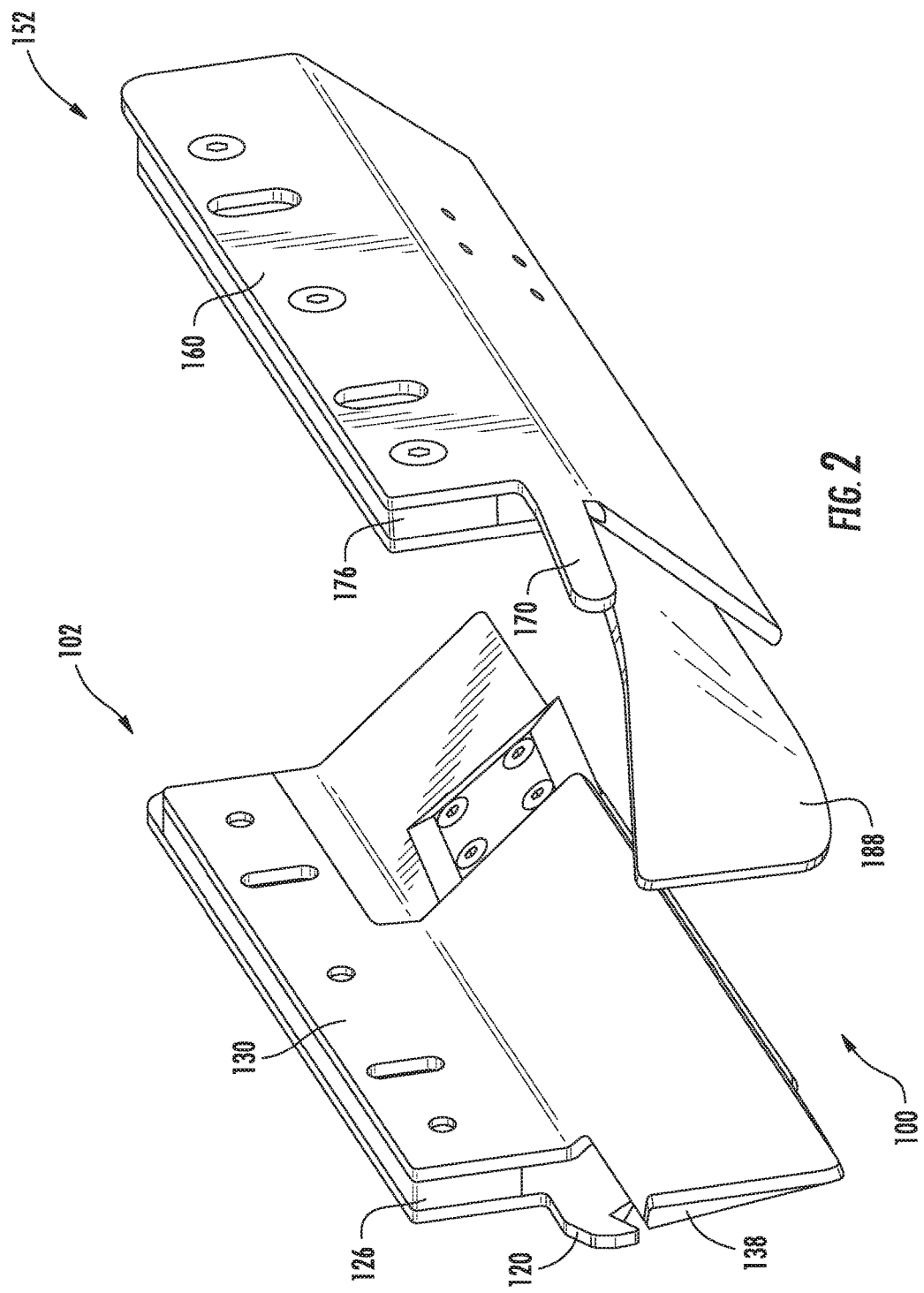
FIG. 2 is an isometric view of the separation tool showing the first and second assemblies spaced apart and adjacent a centerline.
Figure 3:
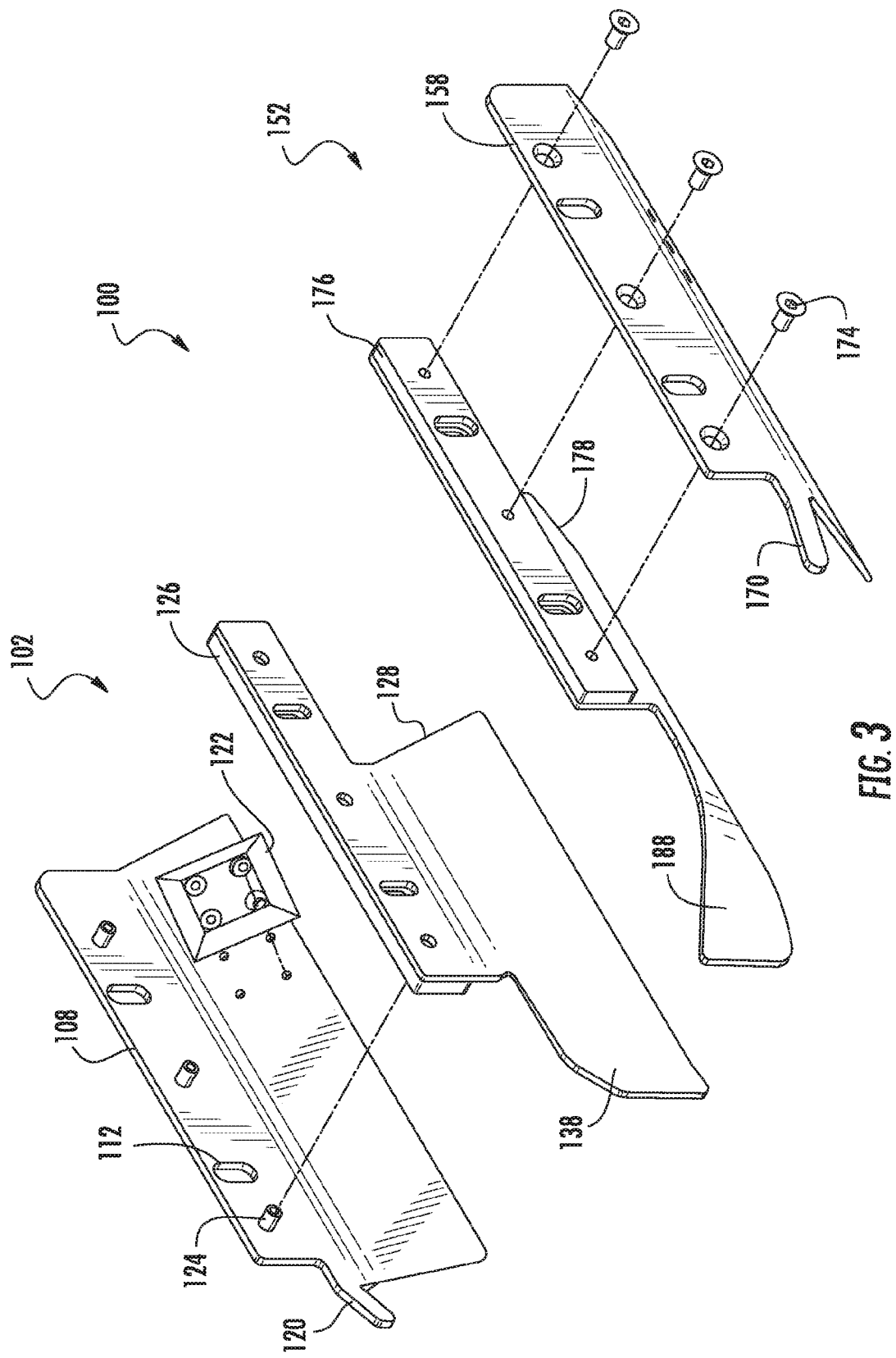
FIG. 3 is an exploded view of the separation tool.
Figure 4:
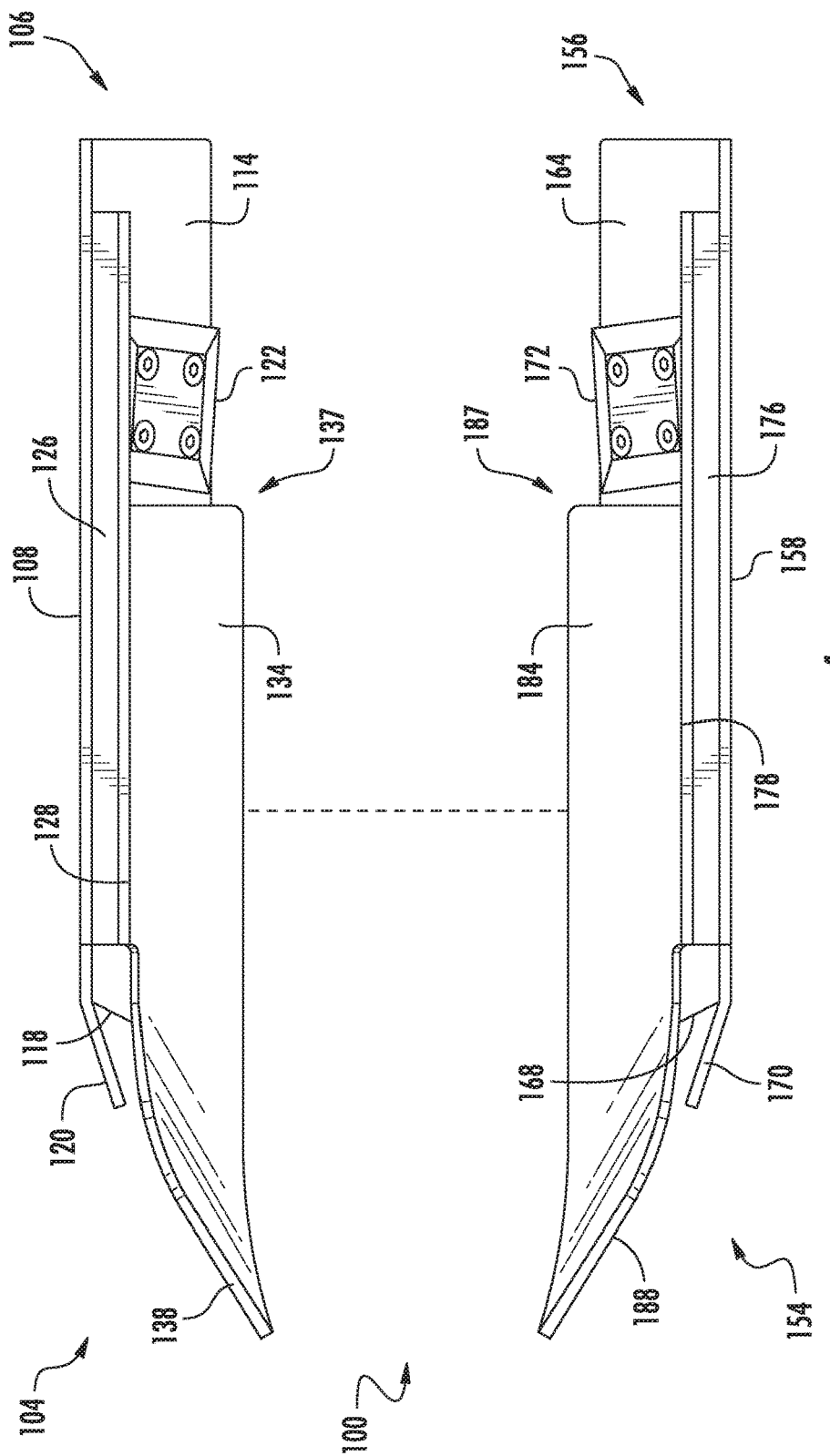
FIG. 4 is a top plan view of the separation tool.
Figure 5:
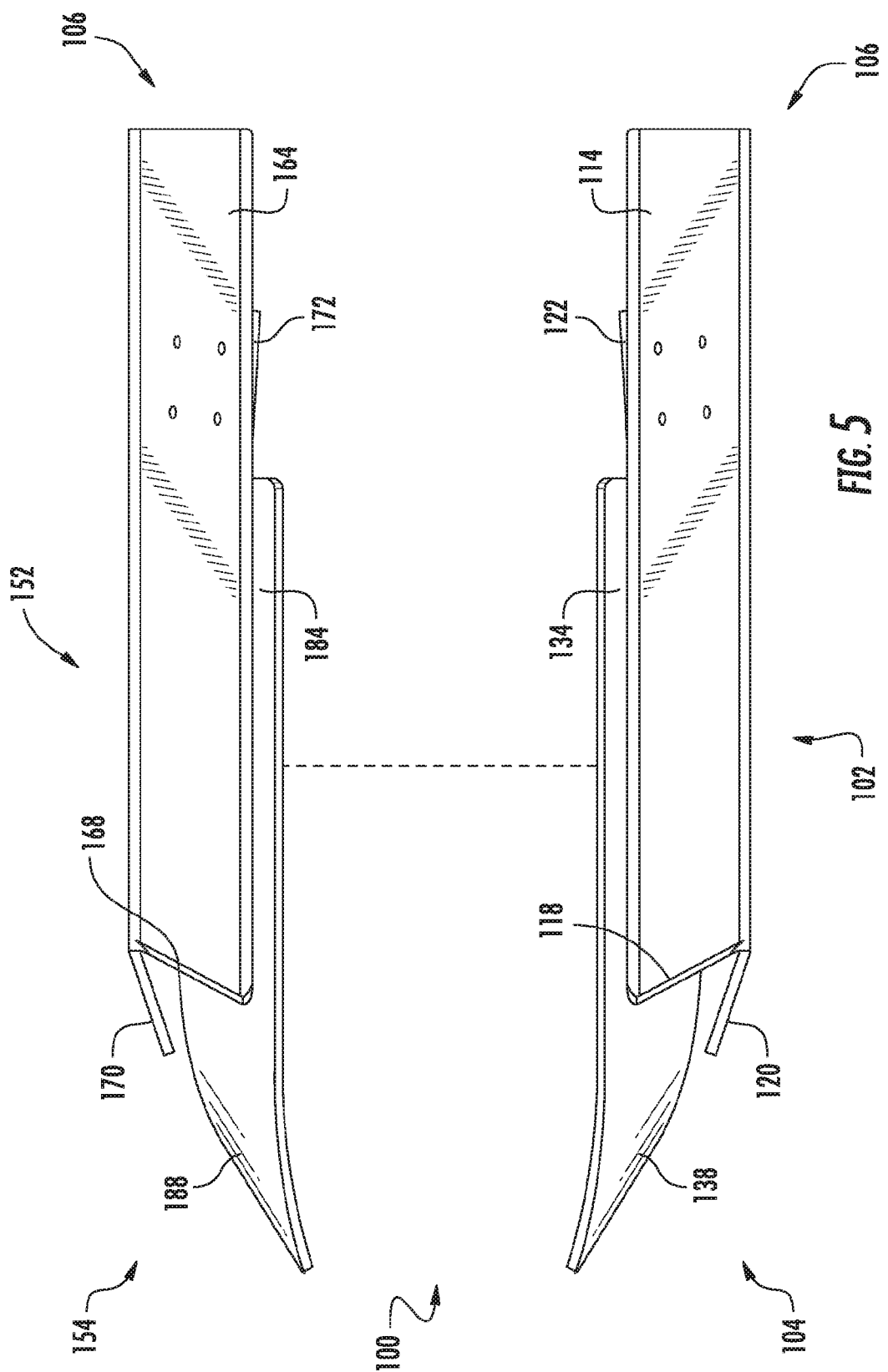
FIG. 5 is a bottom plan view of the separation tool.
Figure 6:
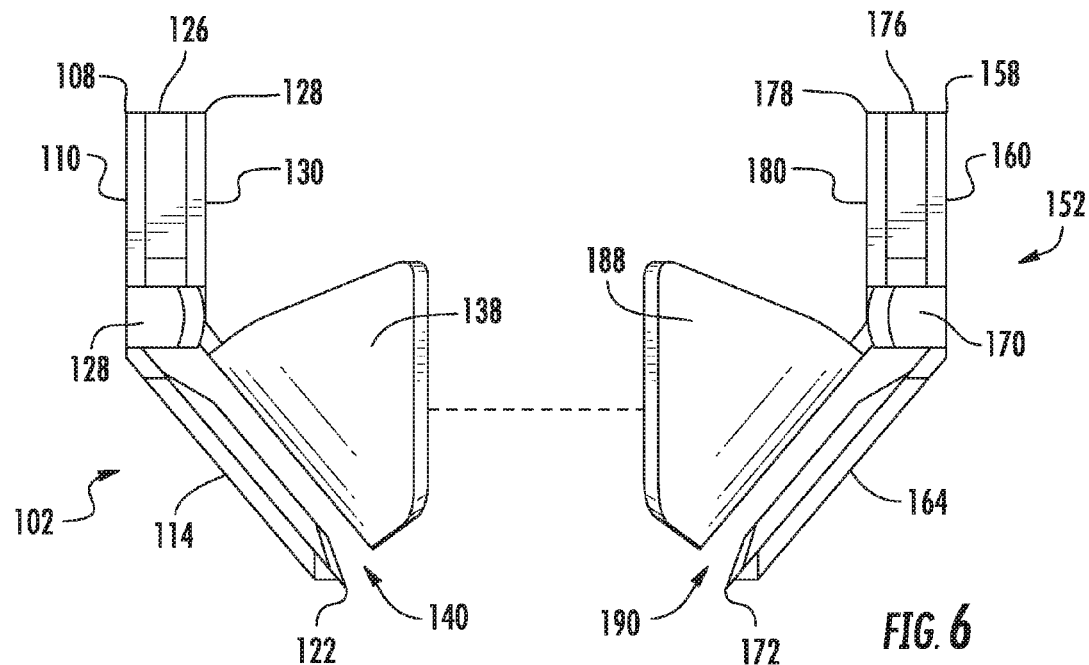
FIG. 6 is a front elevation view of the separation tool.
Figure 7:
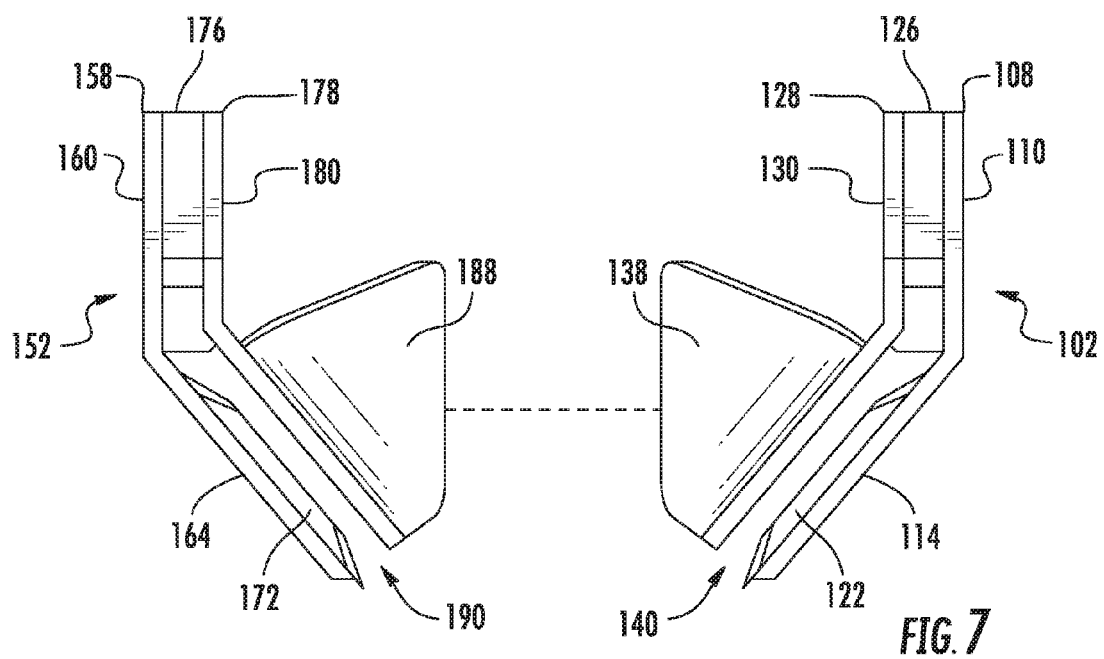
FIG. 7 is a rear elevation view of the separation tool.

The disclosed subject matter will now be described with reference to the drawing figures, in which like reference numerals refer to like parts throughout. For purposes of clarity in illustrating the characteristics of the present disclosed subject matter, proportional relationships of the elements have not been maintained in the figures. In some cases, the sizes of certain small components have been exaggerated for illustration.

A method and an apparatus for processing a rear half of a poultry carcass 402 is shown and described whereby a cut is made to the connective tissue between the leg 404 and the back 406 at the interior of the carcass 402 at a depth below the surface of the tissue between about 0.1 mm to about 7.0 mm allowing the muscle tissue connecting the leg 404 and the back 406 to remain intact, thereby allowing a significantly larger amount of meat to stay connected to the leg 404 meat when the leg 404 bones are disengaged from the hip sockets and the back 406 portion is separated from the legs 404.

Figure 13:
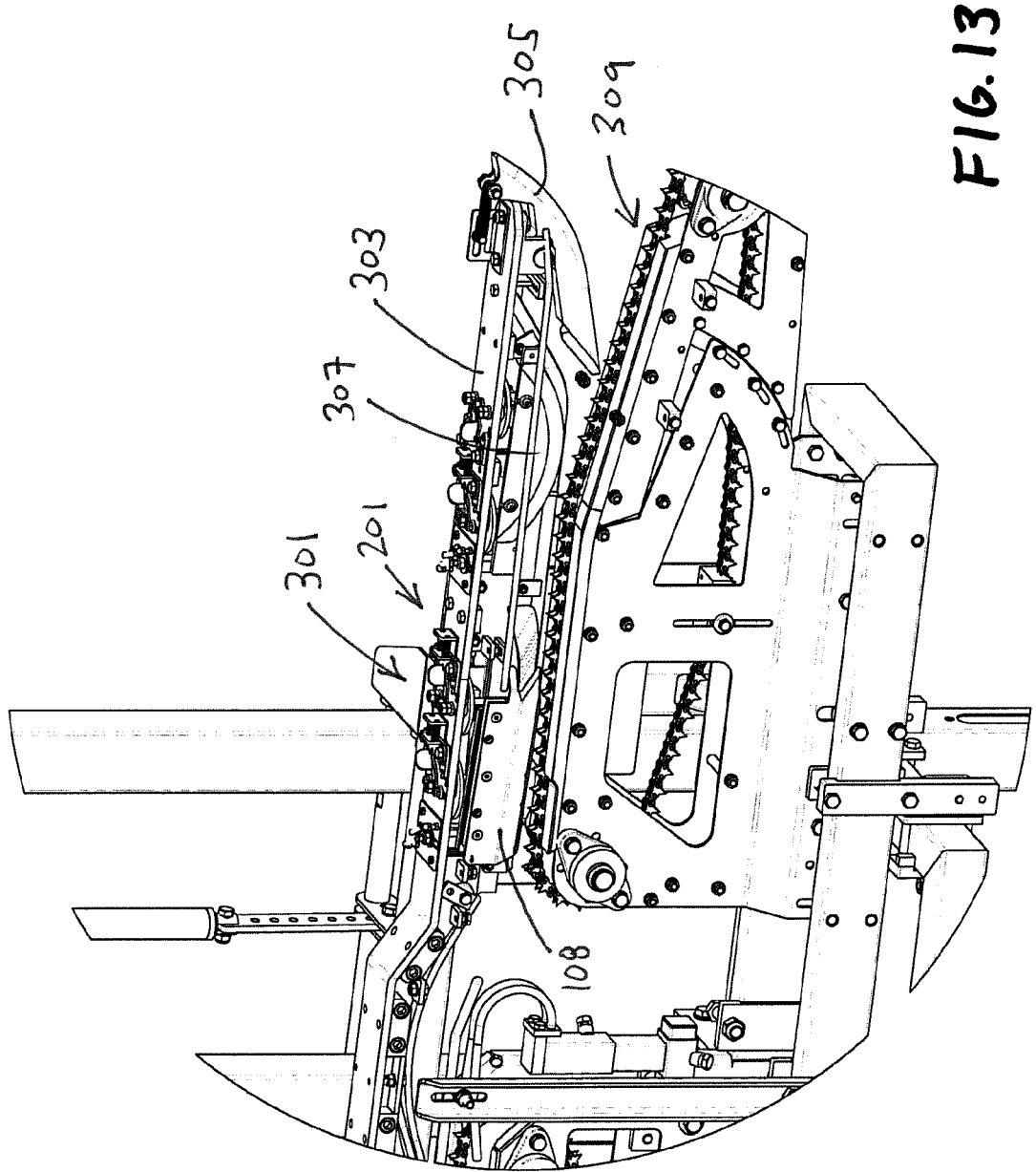
FIG. 13 is an isometric view of the separation tool connected to a mount.
Figure 14:
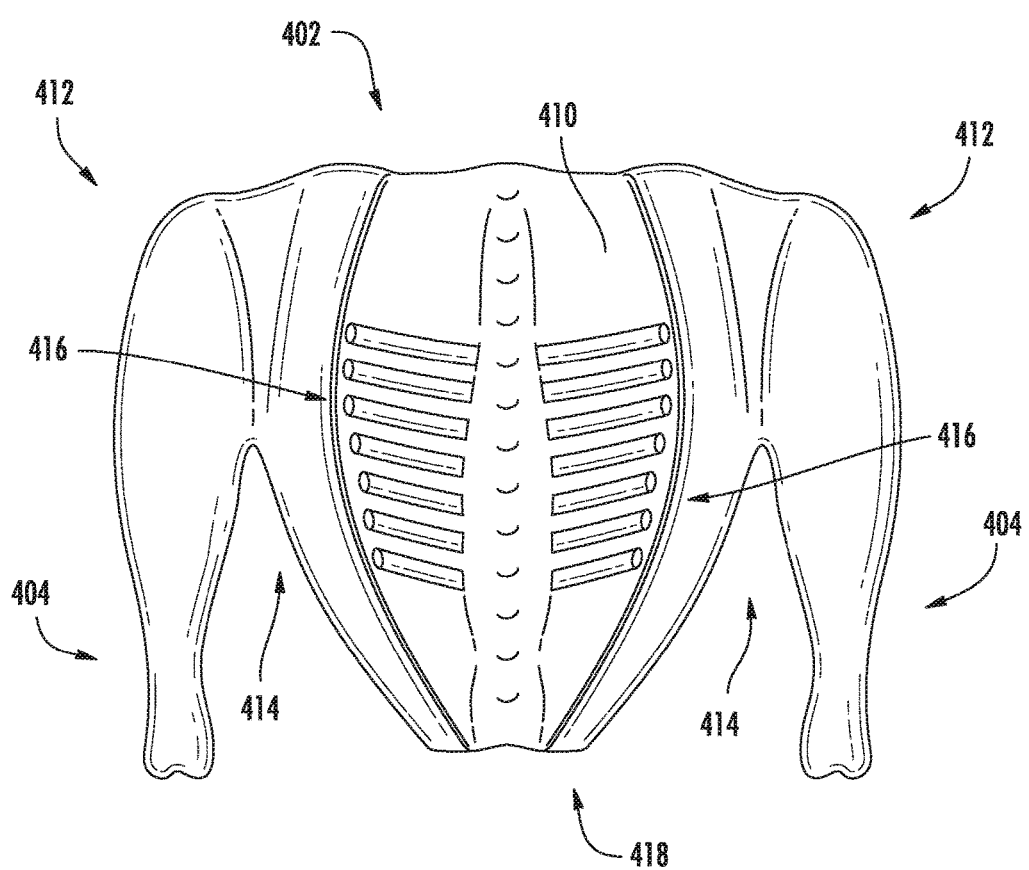
FIG. 14 is a plan view of a poultry carcass with the poultry carcass on its back exposing the body cavity.

Referring to the drawings, a separation tool 100 is shown and described. The tool 100 is manufactured from metal, including stainless steel. The separation tool 100 includes a first assembly 102 positioned opposite a second assembly 152 for cutting the connective tissue between the leg 404 meat and the rear half of a poultry carcass 402 during processing. The first and second assemblies 102, 152 are aligned along a centerline whereby the front portions 104, 154 are closer together than the rear portions 106, 156. The separation tool 100 is connected to an adjustable mount 301 (FIG. 13). The adjustable mount 301 allows adjustment of the distance between the leading edges of the first and second assemblies 102, 152. The mount 301 also provides a connection between the separation tool 100 and a biasing arrangement allowing the distance between the first and second assemblies 102, 152 to increase as needed when the poultry carcass 402 engages the separation tool 100.

The adjustable mount 301 is connected to a rail 303 of a conveyor assembly connected to shackles. The shackles engage the legs 404 of a rear half of a poultry carcass 402 and suspend the carcass 402 from the conveyor whereby the open body cavity 410 is positioned upward, and the back 406 is facing downward and the separation tool 100 passes over the body cavity 410, described further below.

The first assembly 102 extends between a front portion 104 and a rear portion 106, and includes an outer first guide plate 108 with an outer or first face, and an inner or second face spaced apart from an inner second guide plate 128 with an outer or first face, and an inner or second face. In an embodiment, the outer guide plate 108 and the inner guide plate 128 are separated by a spacer 126 disposed between the outer guide plate 108 second face and the inner guide plate 128 first face. In an embodiment the spacer 126 separates plates 108, 128 between about 6 mm to about 10 mm. The plates 108, 128 are joined to the spacer 126 at their upper portions 110, 130, and include apertures 112 for fastening the first assembly 102 to the adjustable mount. In an embodiment, the plates 108, 128 are connected by threaded fasteners 124. A lower portion 114 extends from the upper portion 110 at an obtuse angle from the outer guide plate 108 second face, generally inward toward the centerline of the separation tool 100. A front portion 116 of the outer guide plate 108 includes a leading edge 118 adjacent a second guide surface 120. The leading edge 118 extends forward to the bottom edge of the outer guide plate 108 forming a cutting surface to scrape meat off of the thigh 412 bone. The second guide surface 120 extends forward from the front portion 116 inward toward the centerline of the separation tool 100 for guiding the outer leg 404 of the poultry carcass 402 away from the centerline.

The inner guide plate 128 includes a lower portion 134 extending from the upper portion 130. The lower portion 134 extends from a front portion 136 beginning forward of the upper portion 130 to a rear end 137 terminating adjacent the upper portion 130 allowing access to the cutting element 122. The lower portion 134 extends from the upper portion 130 at an obtuse angle from the inner guide plate 128. The front portion 136 includes a first guide surface 138 that extends at an obtuse angle from the inner guide plate 128 second face forward from the front portion 136 inward toward the centerline of the separation tool 100 for guiding the flank meat 414 of the poultry carcass 402 outward away from the centerline and into the channel 140 between the lower portions 114, 134.

The second assembly 152 extends between a front portion 154 and a rear portion 156, and includes an outer third guide plate 158 with an outer or first face, and an inner or second face spaced apart from an inner fourth guide plate 178 with an outer or first face, and an inner or second face. In an embodiment the outer guide plate 158 and the inner guide plate 178 are separated by a spacer 176 disposed between the outer guide plate 158 second face and the inner guide plate 178 first face. In an embodiment the spacer 176 separates plates 158, 178 between about 6 mm to about 10 mm. The plates 158, 178 are joined to the spacer 176 at their upper portions 160, 180, and include apertures 162 for fastening the second assembly 152 to the opposite side of the adjustable mount. In an embodiment, the plates 158, 178 are connected by threaded fasteners 174. A lower portion 164 extends from the upper portion 160 at an obtuse angle from the outer guide plate 158 second face, generally inward toward the centerline of the separation tool 100. A front portion 166 of the outer guide plate 158 includes a leading edge 168 adjacent a second guide surface 170. The leading edge 168 extends forward to the bottom edge of the outer guide plate 158 forming a cutting surface to scrape meat off of the thigh 412 bone. The second guide surface 170 extends forward from the front portion 166 inward toward the centerline of the separation tool 100 for guiding the outer leg 404 of the poultry carcass 402 away from the centerline.

The inner guide plate 178 includes a lower portion 184 depending from the upper portion 180. The lower portion 184 extends from a front portion 186 beginning forward of the upper portion 180 to a rear end 187 terminating adjacent the upper portion 180 allowing access to the cutting element 172. The lower portion 184 extends from the upper portion 180 at an obtuse angle from the inner guide plate 178 second face. The front portion 186 includes a first guide surface 188 that extends at an obtuse angle from the inner guide plate 178 second face forward from the front portion 186 inward toward the centerline of the separation tool 100 for guiding the flank meat 414 of the poultry carcass 402 outward away from the centerline and into the channel 190 between the lower portions 164, 184.

As a poultry carcass 402 is advanced toward the front portions 104, 154 of the assemblies 102, 152 into engagement with the separation tool 100, the first guide surfaces 138, 188 push the legs 404 outward away from the centerline, and guide the flank meat 414 of the poultry carcass 402 and the lower part of the rib 416 cage (extending upward from the body cavity 410) into the channel 140, 190 (FIG. 15-16). As the carcass 402 further advances into the separation tool 100, the second guide surfaces 120, 170 further pushes the leg 404 outward away from the centerline, increasing the tension on the connection between the legs 404 and the back 406 portion of the carcass 402. As the carcass 402 advances toward the rear portions 106, 156 of the assemblies 102, 152 an area of tissue between the legs 404 and the back 406 are exposed to a cutting element 122, 172 forming a cutting edge removably mounted to the inside face of the lower portions 114, 164 respectively. The cutting elements 122, 172 are angled downward extending beyond the bottom edge of the lower portions 114, 164 between about 0.1 mm to about 7.0 mm. As the carcass 402 engages the cutting elements 122, 172, a cut is made to the connective tissue between the leg 404 and the back 406 at the interior of the carcass 402 at a depth below the surface of the tissue between about 0.1 mm to about 7.0 mm allowing the muscle tissue connecting the leg 404 and the back 406 to remain intact, thereby allowing a significantly larger amount of meat to stay connected to the leg 404 meat when the leg 404 bones are disengaged from their hip sockets and the back 406 portion is separated from the legs 404 in the next step of processing. In an embodiment, the connective tissue cut by cutting elements 122, 172 is the teres ligament or the ligament of the head of the femur of each leg 404.

After the carcass 402 passes the cutting elements 122, 172, the tail 418 of the carcass 402 exits from the separation tool 100, and the carcass 402 continues along the conveyor where the legs 404 are disengaged from their sockets and the back 406 portion is separated from the legs 404.

In an embodiment, an operator manually performs the cut accomplished by the cutting elements 122, 172 by exposing the body cavity 410 of a rear half of a poultry carcass 402, extending the legs 404 laterally away from the center of the carcass 402 exposing the connection between the legs 404 and the back 406, cutting the connective tissue between the leg 404 and the back 406 at the interior of the carcass 402 at a depth below the surface of the tissue between about 0.1 mm to about 7.0 mm allowing the muscle tissue connecting the leg 404 and the back 406 to remain intact, and separating the legs 404 from the back 406. In an embodiment, the connective tissue cut is the teres ligament or the ligament of the head of the femur of each leg 404.

Figure 10:
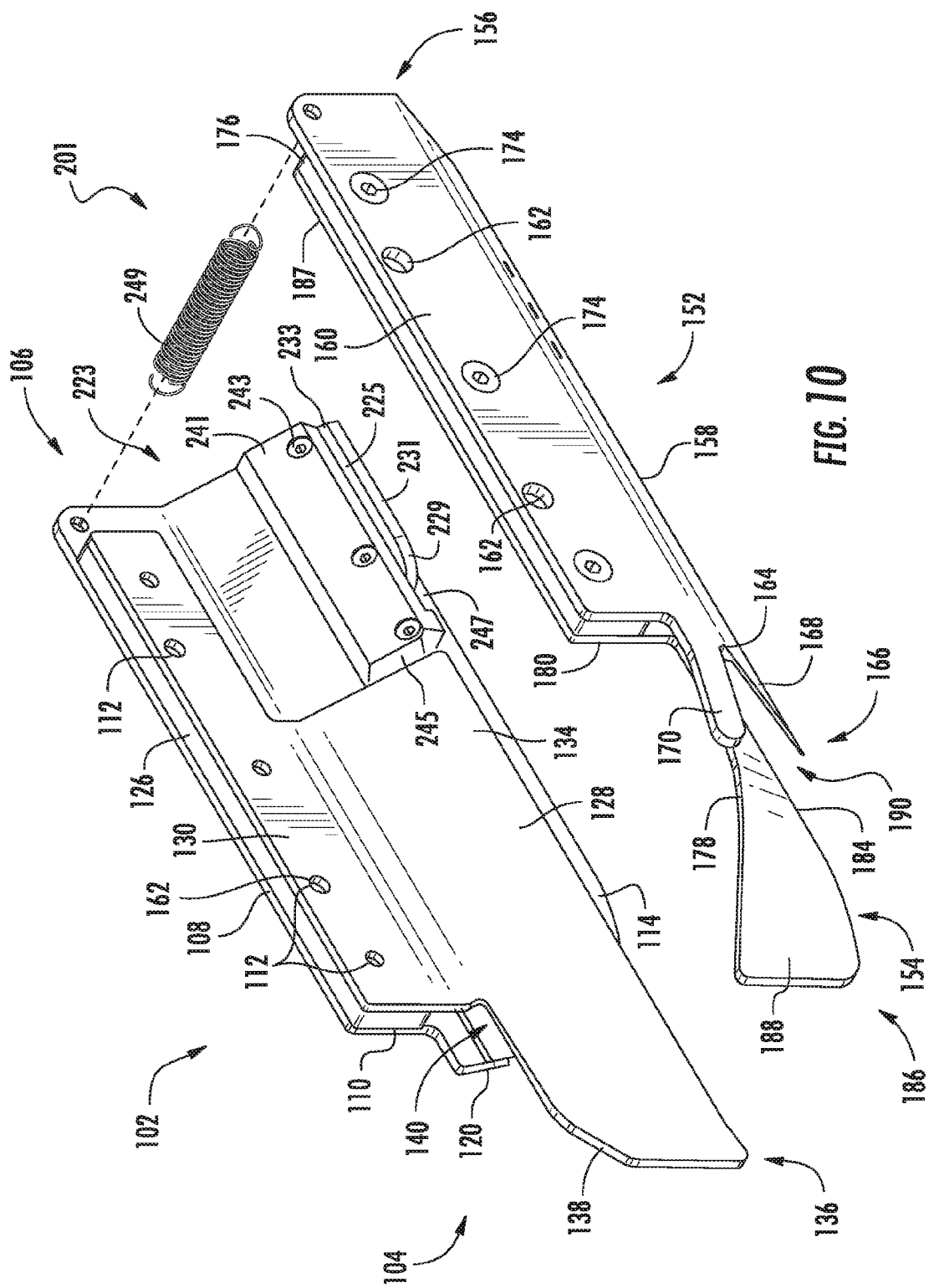
FIG. 10 is an isometric view of an alternative embodiment separation tool showing the first and second assemblies spaced apart and adjacent a centerline.
Figure 11:
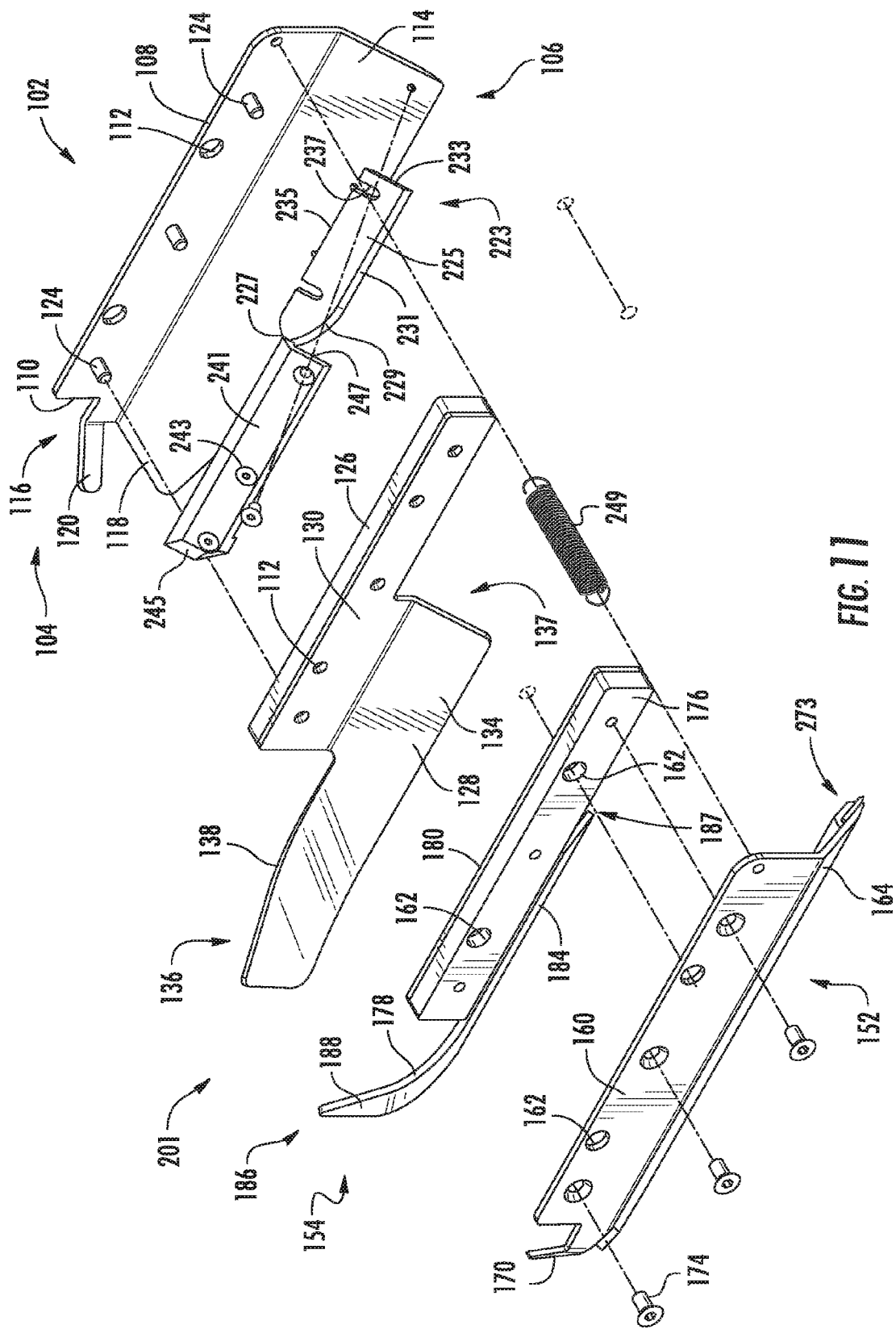
FIG. 11 is an exploded view of the separation tool of FIG. 10.
Figure 12:
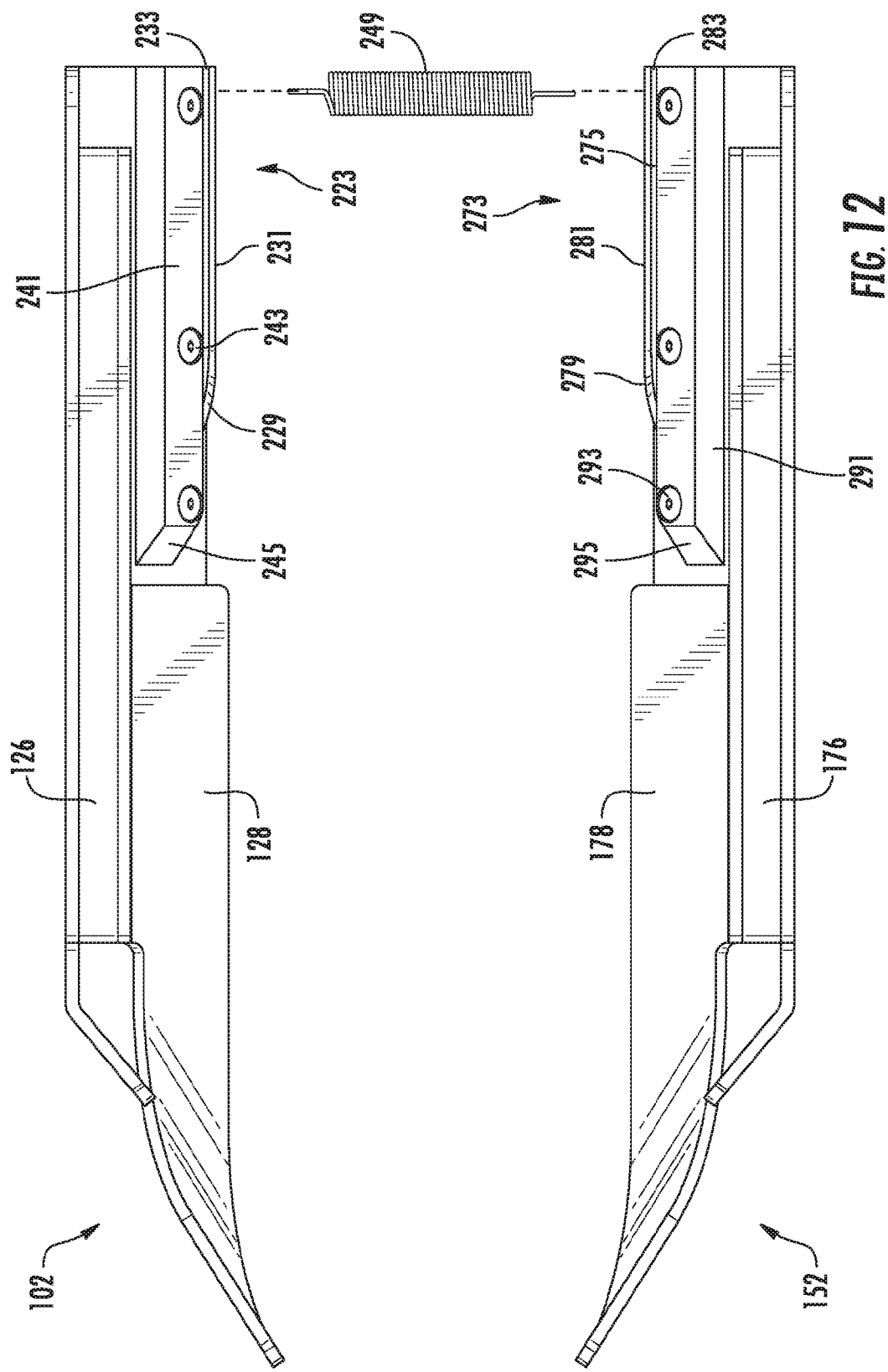
FIG. 12 is a top plan view of FIG. 10.

An alternative embodiment separation tool 201 is shown in FIGS. 10-12. The separation tool 201 includes a first assembly 102 positioned opposite a second assembly 152, where the first assembly 102 has a cutting assembly 223, and the second assembly 152 has a cutting assembly 273. Cutting assembly 223 includes a cutting element 225 moveably secured to the outer guide plate 108 by a mounting bracket 241. The cutting element 225 forms a cutting edge forming a point 229 extending downward from a forward tip 227 into an edge 231 terminating at a heel 233 adjacent the outer guide plate 108 rear portion 106. A back 235 opposite the point 229 and edge 231 extends between the tip 227 and heel 233. The mounting bracket 241 is secured to the lower portion 114 by threaded fasteners 243. A leading edge 245 forward of the point 229 extends from the outer guide plate 108 lower portion 114 toward the heel 233 and prevents tissue from becoming driven between the cutting element 225 and the outer guide plate 108 which would result in misalignment of the cutting element 225 or damage to the cutting element 225. In an embodiment the mounting bracket 241 compresses the cutting element 225 against the outer guide plate 108. The mounting bracket 291 and the lower portion 114 form a slot 247 moveably receiving the cutting element 225. The position of the cutting element 225 relative to the outer guide plate 108 may be adjusted. The point 229 and edge 231 can be adjusted to extend between about 0.1 mm to about 7 mm beyond the bottom edge of the lower portion 114. In an embodiment the distance between the cutting edge of the point 229 and the bottom edge of the lower portion 114 is between about 1 mm to about 4 mm. In an embodiment, the distance between the cutting edge of the heel 233 and the bottom edge of the lower portion 114 is between about 2 mm to about 7 mm. In an embodiment, the distance between the cutting edge of the point 229 and the bottom edge of the lower portion 114 is 2 mm, and the distance between the cutting edge of the heel 233 and the bottom edge of the lower portion 114 is 5 mm. In an embodiment, the distance between the cutting edge of the point 229 and the bottom edge of the lower portion 114 tapers rearward toward the cutting edge of the heel 233 whereby the distance between the cutting edge of the heel 233 and the bottom edge of the lower portion 114 is about 3 mm greater than the distance between the cutting edge of the point 229 and the bottom edge of the lower portion 114. In an embodiment, threaded fasteners 243 are backed off from a seated position to allow movement or removal of the cutting element 225 from the cutting assembly 223.

Cutting assembly 273 includes a cutting element 275 moveably secured to an outer guide plate 108 by a mounting bracket 291. The cutting element 275 forms a cutting edge forming a point 279 extending downward from a forward tip 277 into an edge 281 terminating at a heel 283. A back 285 opposite the point 279 and edge 281 extends between the tip 277 and heel 283 adjacent the outer guide plate 158 rear portion 156. The mounting bracket 291 is secured to the lower portion 164 by threaded fasteners 293. A leading edge 295 forward of the point 279 extends from the outer guide plate 158 lower portion 164 toward the heel 283 and prevents tissue from becoming driven between the cutting element 275 and the outer guide plate 158 which would result in misalignment of the cutting element 275 or damage to the cutting element 275. In an embodiment the mounting bracket 291 compresses the cutting element 275 against the outer guide plate 158. The mounting bracket 291 and lower portion 164 form a slot 297 moveably receiving the cutting element 275. The position of the cutting element 275 relative to the outer guide plate 158 may be adjusted. The point 279 and edge 281 can be adjusted to extend between about 0.1 mm to about 7 mm beyond the bottom edge of the lower portion 164. In an embodiment, the distance between the cutting edge of the heel 283 and the bottom edge of the lower portion 164 is between about 2 mm to about 7 mm. In an embodiment, the distance between the cutting edge of the point 279 and the bottom edge of the lower portion 164 is 2 mm, and the distance between the cutting edge of the heel 283 and the bottom edge of the lower portion 164 is 5 mm. In an embodiment, the distance between the cutting edge of the point 279 and the bottom edge of the lower portion 164 tapers rearward toward the cutting edge of the heel 283 whereby the distance between the cutting edge of the heel 283 and the bottom edge of the lower portion 264 is about 3 mm greater than the distance between the cutting edge of the point 279 and the bottom edge of the lower portion 164. In an embodiment, threaded fasteners 293 are backed off from a seated position to allow movement or removal of the cutting element 275 from the cutting assembly 273.

As above regarding cutting elements 122, 172, a carcass 402 is advanced toward the front portions 104, 154 of the assemblies 102, 152 into engagement with cutting elements 225, 275 (FIGS. 15-16). The cutting elements 225, 275 cut the connective tissue between the leg 404 and the back 406 of the poultry carcass 402 as described with respect to cutting elements 122, 172 above.

An embodiment of the separation tool 201 includes a biasing member allowing the first assembly 201 and second assembly 152 to move relative to one another on the adjustable mount. Biasing member may include a spring 249 connected to rear 106 of outer guide plate 108, and rear 156 of outer guide plate 158.

Referring to FIG. 13, the separation tool 201 is shown connected to an adjustable mount 301. The mount 301 is movably connected to a rail 303. A poultry carcass 402 approaches a centering device 305 at a first end of the rail 303 whereby the open body cavity 410 is positioned upward, and the back 406 is facing downward. The shackles move the poultry carcass 402 into engagement with a chain conveyor 309 and the carcass 402 is moved past the centering device 305 into engagement with half-moon blades 307 that make a pre-cut, and into engagement with the separation tool 201 as described above.

The many features and advantages of the disclosed subject matter are apparent from the detailed specification, and thus, it is intended by the appended claims to cover all such features and advantages of the disclosed subject matter which fall within the spirit and scope of the disclosed subject matter. Further, since numerous modifications and variations will readily occur to those skilled in the art, it is not desired to limit the disclosed subject matter to the exact construction and operation illustrated and described, and accordingly, all suitable modifications and equivalents may be resorted to, falling within the scope of the disclosed subject matter.

Having thus described the disclosed subject matter, what is claimed is:

1. A method of harvesting tissue from a bird carcass, comprising:
   cutting connective tissue between a leg bone and the bird carcass, wherein muscle tissue connecting the leg bone and the back remain intact; and
   separating the leg bone from the carcass wherein leg muscle tissue remains connected to back muscle tissue.

2. The method of claim 1, wherein the cut extends between about 0.1 mm to about 7.0 mm below the surface of the tissue.

3. The method of claim 1, wherein the connective tissue is the teres ligament.

4. The method of claim 1, further comprising the step of separating the leg muscle tissue and back muscle tissue from the leg bone.

5. A method of harvesting tissue from a bird carcass, comprising:
   extending a leg bone laterally away from the center of the bird carcass; and
   cutting connective tissue between the leg bone and the carcass, wherein the muscle tissue connecting the leg bone and the back remain intact.

6. The method of claim 5, wherein the cut extends between about 0.1 mm to about 7.0 mm below the surface of the connective tissue.

7. The method of claim 5, wherein the connective tissue is the teres ligament.

8. The method of claim 5, further comprising separating the leg bone from the carcass.

9. The method of claim 8, further comprising the step of separating the leg muscle tissue and back muscle tissue from the leg bone.

10. A method of harvesting tissue from a bird carcass, comprising:
    suspending a bird carcass with an open body cavity and back portion whereby the open body cavity is positioned upward and the back is positioned downward;
    exposing an area of tissue between a leg and the open body cavity; and
    cutting the tissue between the leg and the open body cavity.

11. The method of claim 10, wherein the cut extends between about 0.1 mm to about 7.0 mm below the surface of the tissue.

12. The method of claim 10, wherein the connective tissue is the teres ligament.

13. A method of harvesting tissue from a bird carcass, comprising:
    cutting tissue between a leg and a back of the bird; and
    separating the leg from the back wherein muscle tissue connecting the leg and the back remain intact.

14. The method of claim 13, wherein the cut extends between about 0.1 mm to about 7.0 mm below the surface of the tissue.

15. The method of claim 13, wherein the tissue is connective tissue.

16. The method of claim 14, wherein the connective tissue is the teres ligament.

17. The method of claim 15, further comprising:
    providing a first assembly, comprising:
       a first guide plate with a first face and a second face, the first guide plate forming:
          an upper portion extending between a front portion and a rear portion;
          a guide surface extending from the front portion of the first guide plate upper portion; and
          a lower portion extending from the upper portion forming a bottom edge, and a cutting surface adjacent the upper portion front portion;
       providing a second guide plate with a first face and a second face, the second guide plate forming:
          an upper portion; and
          a lower portion extending from the upper portion, the lower portion extending between a front portion and a rear portion, wherein the front portion extends at an obtuse angle from the second guide plate lower portion second face
       wherein the first guide plate lower portion extends from the first guide plate upper portion at an obtuse angle from the second face;
       wherein the second guide plate lower portion extends from the second guide plate upper portion adjacent to the first guide plate lower portion; and
       providing a cutting edge extending beyond the bottom edge of the first guide plate lower portion for cutting the tissue between the leg and the back of the bird carcass.

* * * * *

UNITED STATES PATENT AND TRADEMARK OFFICE
CERTIFICATE OF CORRECTION

PATENT NO. : 10,165,783 B2
APPLICATION NO. : 15/711154
DATED : January 1, 2019
INVENTOR(S) : Dion Joseph Moulds and Gerald Kent Lauer It is certified that error appears in the above-identified patent and that said Letters Patent is hereby corrected as shown below:

In the Claims

In Column 8, Line 4, Claim 12, delete "connective"

Signed and Sealed this
Second Day of April, 2019

Andrei Iancu
*Director of the United States Patent and Trademark Office*